UNITED STATES PATENT OFFICE.

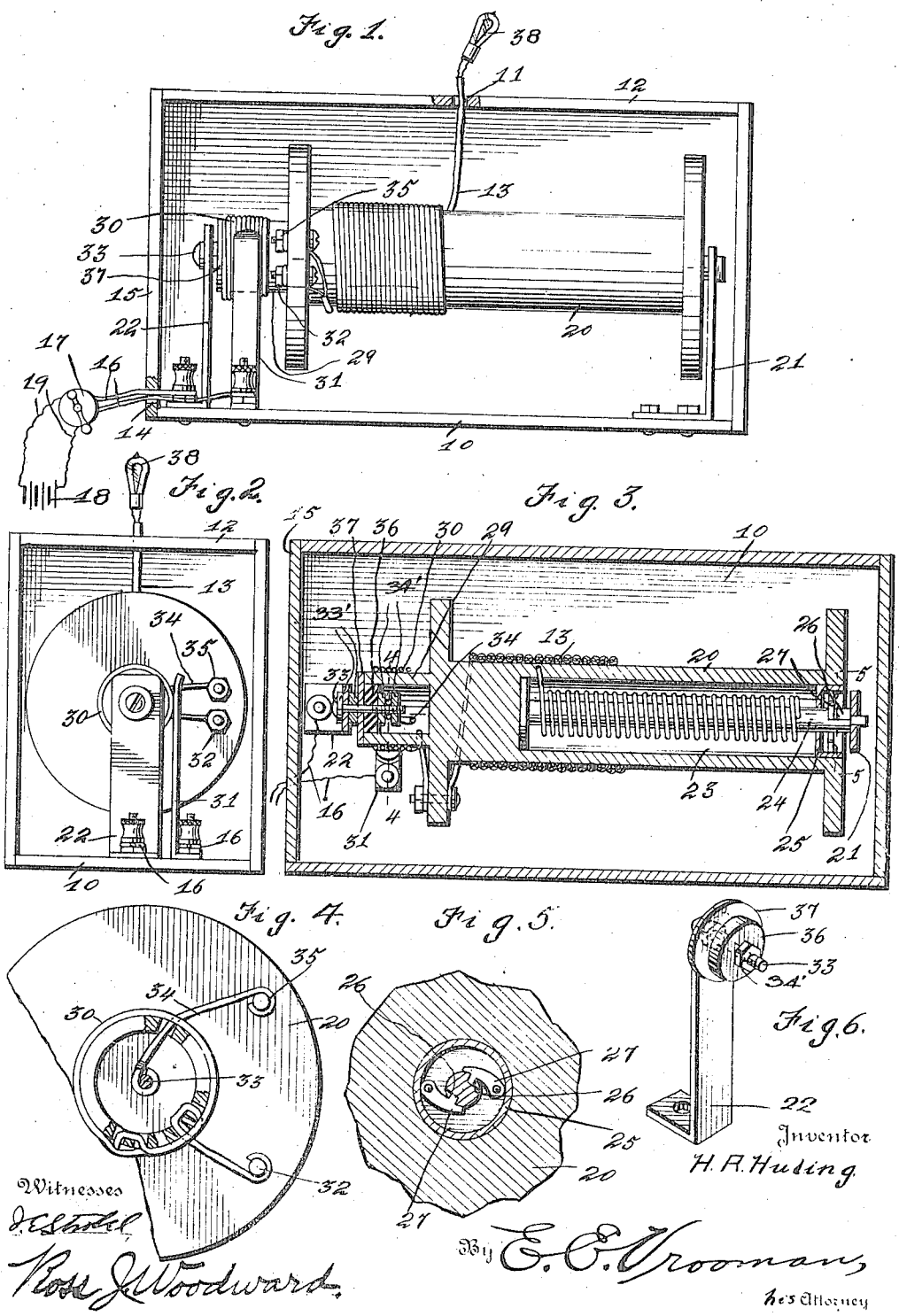
H. R. HULING.
REEL FOR ELECTRIC CONDUCTORS.
APPLICATION FILED SEPT. 15, 1913.
1,216,319. Patented Feb. 20, 1917.

HARRY R. HULING, OF SCHUYLKILL HAVEN, PENNSYLVANIA.

REEL FOR ELECTRIC CONDUCTORS.

1,216,319.    Specification of Letters Patent.    Patented Feb. 20, 1917.

Application filed September 15, 1913. Serial No. 739,929.

*To all whom it may concern:*

Be it known that I, HARRY R. HULING, a citizen of the United States of America, residing at Schuylkill Haven, in the county of Schuylkill and State of Pennsylvania, have invented certain new and useful Improvements in Reels for Electric Conductors, of which the following is a specification, reference being had therein to the accompanying drawing.

This invention relates to reels for electric conductors which is intended to be used in connection with an automobile. The principal object of the invention is to so construct the lamp that the power wire feeding the lamp may be unwound from a reel and thus the light conveyed from one place to another so that the various parts of the automobile may be lighted in case something goes wrong with the machine at night.

Another object of the invention is to so construct the reel that the feed wire will be wound upon the reel when the light is not in use.

Another object of the invention is to provide an improved type of contact mechanism so that the light will be illuminated at all times excepting when the switch is turned to the cut-off position.

Another object of the invention is to so construct the device that it will be compact and take up as small an amount of space as possible.

This invention is illustrated in the accompanying drawings, wherein:

Figure 1 is an elevation of the device with the front wall of the box removed.

Fig. 2 is an end elevation with one end wall of the box removed.

Fig. 3 is a longitudinal sectional view through the box and reel.

Fig. 4 is an enlarged sectional view through the reel taken along the line 4—4, Fig. 3.

Fig. 5 is a fragmentary sectional view taken on the line 5—5, Fig. 3.

Fig. 6 is a perspective view of the bearing at the left-hand end of the reel shown in Fig. 3.

The box or housing 10 for this device is provided with an opening 11 in its upper wall 12 so that the feed wire 13 can pass through the upper wall, and is provided with a smaller opening 14 in the end wall 15 so that the wires 16 leading from the switch 17 can enter the housing. The battery 18 is connected with the switch 17 by means of the wires 19 and it will thus be seen that the flow of electricity from the battery can be controlled by means of the switch 17.

A reel 20 the head of which is formed of insulating material is rotatably mounted within the housing 10 by means of the metallic bearings 21 and 22 and is provided with a longitudinally-extending opening 23 in which there is positioned a spindle 24. This spindle 24 has its outer end extending through a collar 25 and is provided with notches 26 which are intended to be engaged by pawls 27 so that the spring 28 can be held in a tightened condition, and thus the reel 20 caused to rewind when the lamp is no longer to be used. The hub of the reel is extended as shown in Figs. 1 and 3 to form the housing 29 and this housing has a wire 30 wound thereon, thus forming a contact collar which is engaged by a resilient contact strip 31 which is connected with one of the wires 16. One end of the wire 30 is secured to the hub, as shown in Fig. 4, and the other end is connected with the binding nut 32.

A screw 33 which forms a stub axle for the reel is carried by the bearing 22 and extends into the housing 29 with its inner end connected with the inner end of a wire 34 which has its outer end secured to the post 35. Washers 33′ are mounted upon the screw 33 so as to fit upon each side of the bearing 22 as shown in Fig. 3. A collar 36 and an end cap 37 are then mounted upon the screw 33 as shown in Fig. 6, and form a closure for the end of the housing as shown in Fig. 3. The wire 34 is held in engagement with the screw 33 by means of the clamping nuts 34′. The inner nut engages the collar 36 whereby the washers 33′ will be held upon the bearing 22 for constituting a support for one end of the reel. The bearing 22 is formed of copper and it will thus be seen that electricity can pass through this bearing to the copper screw 33 and thence through the wire 34 into the post 35. The electricity will then pass into one of the wires of the cable 13 to light the lamp 38, and will then pass back through the binding-nut 32 to the contact strip 31 and back into the battery.

By means of the construction clearly shown in Fig. 3, the reel can be turned to withdraw as much of the cable from the housing as desired without the electric circuit being broken since the wire 34 is connected with the screw 33 of the reel and the wire 30 is coiled to form a circular collar extending about the housing 29.

The box or housing 10 is placed upon the running board or any other convenient place in the body of the automobile, and when not in use the cable 13 will be wound upon the reel as shown in Fig. 1. The switch 17 will normally be turned off so that the electricity will not be wasted and is only turned on when it is desired to use the light. If something happens to the engine and it is desired to examine the engine in a dark road or in a place where there is not very much light, the switch is turned on and the cable 13 is drawn out a sufficient distance to permit the light to be carried to that part of the engine which it is desired to examine. When the engine has been repaired, the reel is permitted to rewind, thus drawing the cable back into the housing.

The pawls 27 are so mounted that they hold the reel against turning, thus preventing the reel from rewinding every time the lamp is released and it will thus be seen that it is not necessary to at all times hold on to the light in order to prevent the cable from being rewound. When it is desired to rewind the cable, the pawls are removed from the position shown in Fig. 5 and this will permit the cable to be rewound.

It will be obvious from the foregoing that my lamp can be readily placed on a motor-vehicle in such manner that it may be used as a regular light equipment, when not in use as an extension lamp, or trouble finder, such as a tail or side lamp, or dash lamp for illuminating the speedometer.

Furthermore, among its many other uses or its adaptability, it can be utilized in a factory lighting system, such as extension lamps for machine shops and garages; it is also useful as a reel to reel up the surplus cord on desk telephones when the same is not in use.

From the foregoing it will be obvious that I have produced an exceedingly practical and useful invention and I do not desire to be limited to the specific construction and arrangement specified, and, as a consequence, I reserve the right to change or alter the construction, as permitted under my claim hereunto appended.

What is claimed as new is:—

In a reel for an electric conductor, the combination with a housing, a plurality of bearings, said reel rotatably carried by said bearings, a contact pivot pin carried by one of said bearings and extending into one end of said reel and forming a support for one end of said reel, a feed wire, an auxiliary wire, said feed wire connected at one end with said contact pin, a contact collar formed upon one end of said reel by said auxiliary wire, a contact strip engaging said collar, and means carried by said reel for causing the automatic return of said reel to normal position.

In testimony whereof I hereunto affix my signature in presence of two witnesses.

HARRY R. HULING.

Witnesses:
W. L. BECKER,
W. F. DEIBERT.